United States Patent
Konanur et al.

(10) Patent No.: US 10,469,130 B2
(45) Date of Patent: Nov. 5, 2019

(54) WIRELESS ENERGY AND DATA TRANSFER TO A DISPLAY OF AN INPUT DEVICE

(71) Applicant: Intel Corporation, Santa Clara, CA (US)

(72) Inventors: Anand Konanur, Sunnyvale, CA (US); Steven Gaskill, Corvallis, OR (US); Ayeshwarya B. Mahajan, Bangalore (IN); Ulun Karacaoglu, San Diego, CA (US); Sukanya Sundaresan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 14 days.

(21) Appl. No.: 14/581,656

(22) Filed: Dec. 23, 2014

(65) Prior Publication Data
US 2016/0183034 A1 Jun. 23, 2016

(51) Int. Cl.
H04B 5/00 (2006.01)
H04W 4/80 (2018.01)

(52) U.S. Cl.
CPC ......... *H04B 5/0031* (2013.01); *H04B 5/0012* (2013.01); *H04B 5/0081* (2013.01); *H04W 4/80* (2018.02)

(58) Field of Classification Search
CPC ...... H04B 5/0031; H04B 5/02; H04B 5/0087; H04W 4/008
USPC ...................................... 455/41.1, 41.2–41.3
See application file for complete search history.

(56) References Cited

U.S. PATENT DOCUMENTS

| 6,489,932 | B1 | 12/2002 | Chitturi et al. |
| 7,941,194 | B2 | 5/2011 | Ganwani et al. |
| 8,660,491 | B1* | 2/2014 | Tran ..................... H04B 5/0031 |
| | | | 455/41.1 |
| 8,907,858 | B2* | 12/2014 | Yang ........................ H01Q 7/00 |
| | | | 343/702 |
| 2004/0145580 | A1 | 7/2004 | Perlman |
| 2009/0231109 | A1 | 9/2009 | Reichert et al. |
| 2011/0012717 | A1* | 1/2011 | Pance ..................... G06F 3/016 |
| | | | 340/407.2 |
| 2012/0086658 | A1 | 4/2012 | Moradian |
| 2012/0220219 | A1 | 8/2012 | Hill et al. |
| 2013/0176237 | A1 | 7/2013 | Chu |

(Continued)

OTHER PUBLICATIONS

IEEE transactions on wireless communications. MIMO Broadcasting for Simultaneous Wireless Information and Power Transfer. Zhang et al., vol. 12, May 5, 2013. pp. 1989-1996.*
MIMO Broadcasting for Simultaneous Wireless Inforamtion and Power transfer, Zhang et al., IEEE Transactions on Wireless Communciations, vol. 12, May 2013, pp. 1989-2001.*

(Continued)

*Primary Examiner* — Edward F Urban
*Assistant Examiner* — Angelica M Perez
(74) *Attorney, Agent, or Firm* — International IP Law Group, P.L.L.C.

(57) ABSTRACT

Techniques related to wireless communication of an input device are described herein. An apparatus may include a display at the input device, a wireless transmission architecture, and a wireless receiver. The wireless transmission architecture is to broadcast a signal to the display, and wireless receiver to receive the broadcast signal at the display. The broadcast signal is configured to provide a power signal to initiate operations of the display, a data signal to provide content to be displayed at the display, or any combination thereof.

22 Claims, 8 Drawing Sheets

(56) References Cited

U.S. PATENT DOCUMENTS

| | | |
|---|---|---|
| 2013/0222224 A1 | 8/2013 | Eriksson et al. |
| 2013/0222266 A1 | 8/2013 | Gardenfors et al. |
| 2014/0011543 A1 | 1/2014 | Li et al. |
| 2014/0015756 A1 | 1/2014 | Tang |
| 2014/0111475 A1 | 4/2014 | Bae |
| 2014/0253520 A1* | 9/2014 | Cueto .................. G06F 3/0383 345/179 |
| 2014/0362837 A1 | 12/2014 | Yang et al. |
| 2015/0116296 A1* | 4/2015 | Greene ................ H04B 5/0037 345/211 |
| 2015/0186986 A1 | 7/2015 | Voege et al. |
| 2015/0243245 A1 | 8/2015 | Jung |
| 2016/0119548 A1 | 4/2016 | Geurts et al. |
| 2016/0162241 A1 | 6/2016 | An et al. |

OTHER PUBLICATIONS

Dennentyev, et al., Wireless Powered Bistable Display Tags, UbiComp'13, Zurich, Switzerland, Aug. 12, 2013. pp. 383-386. (Year: 2013).*
Mahajan, et al., "Bi-Stable Display Based Off-Screen Keyboard", Utility U.S. Appl. No. 14/498,913, filed Sep. 26, 2014, pp. 1-37.
Mahajan, et al., "Run-Time Image Display on a Device", Utility U.S. Appl. No. 14/498,506, filed Sep. 26, 2014, pp. 1-26.
Yarvis, et al., "Customized Display and Function for Keys on a Keyboard", I.N. Provisional Patent Application No. 4363/CHE/2013, filed on Sep. 26, 2013, pp. 1-13.
Yarvis, et al., "Customized Display and Function for Keys on a Keyboard", Utility U.S. Appl. No. 14/498,891, filed Sep. 26, 2014, pp. 1-30.
PCT International Search Report, PCT Application No. PCT/US2015/054165, dated Feb. 23, 2016, 3 pages.
Zhang, et al., "MIMO Broadcasting for Simultaneous Wireless Information and Power Transfer," IEEE Transactions on Wireless Communications, 2013, vol. 12, Issue 5, pp. 1989-2001.

* cited by examiner

WIRELESS ENERGY AND DATA TRANSFER TO A DISPLAY OF AN INPUT DEVICE

TECHNICAL FIELD

This disclosure relates generally to wireless connections to an input device. More specifically, the techniques described herein include wireless energy and data transfer to a display of an input device.

BACKGROUND ART

In computer systems, an input devices may be used to receive input from a user of a computing device. For example, a keyboard may be used to receive input from a user when a key is pressed on the keyboard. The input may be provided to a connected computing device. In some cases, an input device may include a static label or otherwise non-programmable interface. User preferences may dictate a customizable system for input devices. At the same time, a tactile experience may be desired. For example, while a keyboard interface may be static, a touchscreen displaying a virtual customizable keyboard may lack tactile feedback inherent in mechanical travel of a key in a physical keyboard.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The subject matter disclosed herein relates to techniques for wireless communication with a display on an input device. As discussed above, user preferences may dictate a customizable system for input devices, while, at the same time dictating a tactile experience. The tactile experience may include motion of a component of the input device, such as motion of a key of a keyboard as the key is pressed and released. This type of tactile feedback may be present at a traditional keyboard as opposed to a virtually displayed keyboard that is rendered on a touch screen of a device, such as on a tablet computing device.

The techniques described herein include an input device having a display. In some cases, the display may be a bistable display, but any display may be used wherein energy and data communication may be received via wireless coupling. A bistable display may include an electronic paper (ePaper) bistable display. An input device, such as a keyboard, may include a bistable ePaper display on each of the keys of the keyboard. This may enable the keys to be configurable while allowing tactile feedback and experience associated with pressing a key of a keyboard. A bistable display may be configured to retain an image without power. However, power may be used to change the image to be displayed on the bistable displays at each key. A physical wiring of each display to a power source may impede or frustrate movement of each key and may not be reliable after millions of keystrokes. In this scenario, a physical wiring or physical connector of any kind may compromise the tactile experience and feedback benefits.

The techniques described herein further include wireless communication to provide power and data to a display on an input device. While the techniques discussed herein are generally discussed in terms of a keyboard input device, the techniques may be applied to other types of input devices wherein movement of a given component provides tactile experience and feedback, such as a mouse having one or more buttons. In this scenario, a mouse may have one or more bistable displays that may change the content to be displayed without necessarily requiring a wired architecture from a power source or controller to the display. In some cases, the techniques may be applied to any other type of non-input device such as a cover of tablet having one or more displays that may change content, such as a temperature of the environment, without requiring wiring to a main unit.

Figure 1:
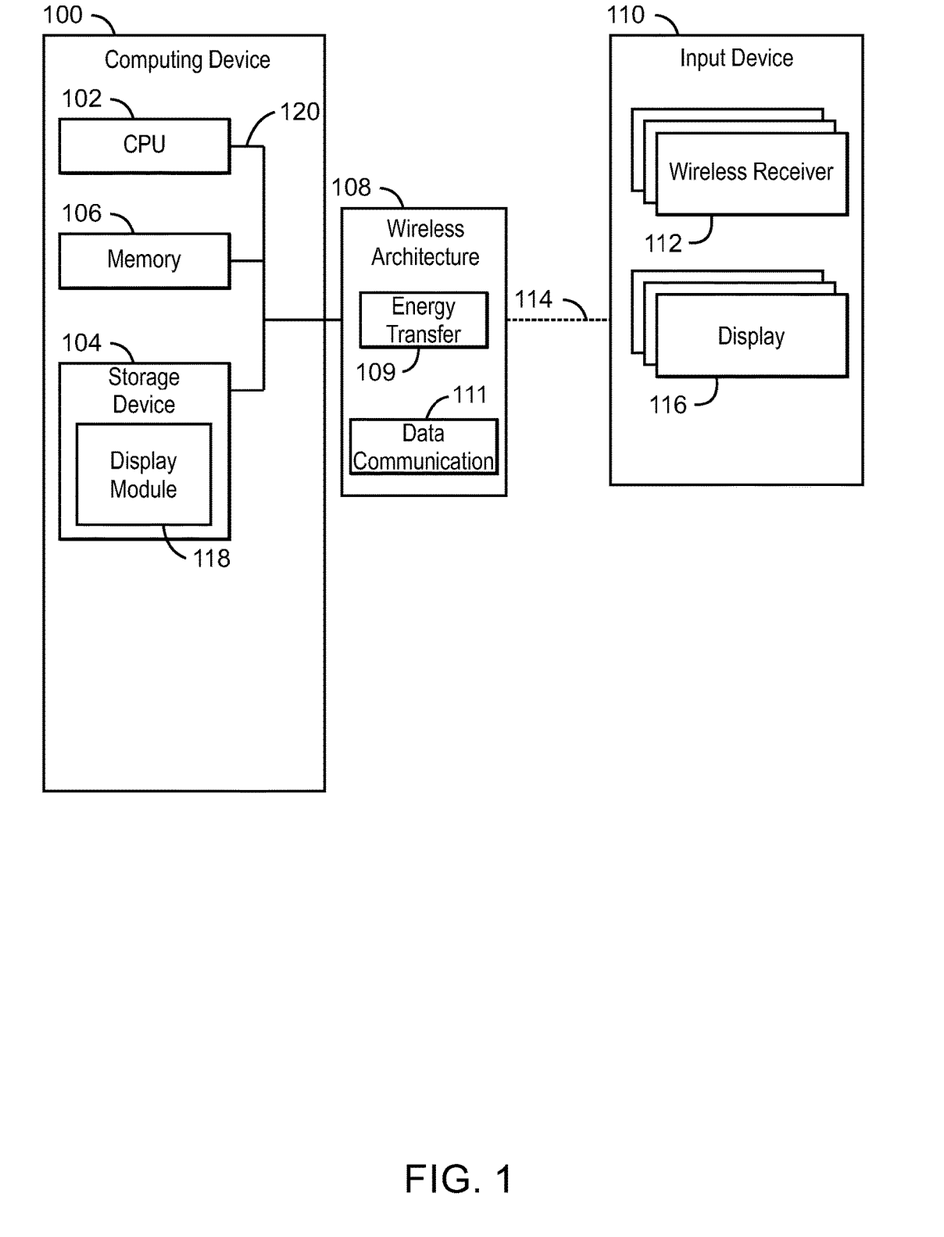
FIG. 1 is a block diagram illustrating a computing device configured to wirelessly communicate with an input device.

FIG. 1 is a block diagram illustrating a computing device configured to wirelessly communicate with an input device. The computing device 100 may be, for example, a laptop computer, desktop computer, ultrabook, tablet computer, mobile device, or server, among others. The computing device 100 may include a central processing unit (CPU) 102 that is configured to execute stored instructions, as well as a storage device 104 including a non-transitory computer-readable medium, and a memory device 106.

The computing device 100 may be communicatively coupled to a wireless architecture 108 including one or more energy transfer components 109 and one or more data communication components 111 with an input device 110 having a wireless receiver 112, as indicated by the dashed line 114. The wireless architecture 108 may be an integrated component of the computing device 100, of the input deice 110, a discrete component, or any combination thereof. In some cases, the wireless architecture 108 may be a near-field communication (NFC) architecture and the wireless receiver may include an NFC receiver coil, as discussed in more detail below in regard to FIGS. 2-4. Further, NFC, as referred to herein, may refer to any near field power and communications techniques wherein wireless power and data a transferred.

In some cases, the wireless receiver 112 may be a metal pad to be capacitively coupled to a metal pad of the wireless architecture 108, as discussed in more detail below in regard to FIG. 5. In yet other cases, the wireless architecture may implement any combination of wireless energy and data delivery as discussed herein.

In some cases, the input device 110 is an external input device, such as an external keyboard to the computing device 100. However, in some cases, the input device 110 is an integrated component of the computing device 100. Further, in some cases, the wireless architecture 108 is implemented as an integrated component of the input device 110, rather than a discrete component. In yet other cases, a portion of the wireless architecture 108 may be implemented as an integrated component of the input device 110, while other portion(s) of the wireless architecture 108 are implemented as components external to the input device 110.

In any case, the input device 110 may include one or more displays 116 configured to display an image based on data received from the wireless architecture 108, as well as receive power from the wireless architecture 108 via the wireless receiver 112. In some cases, the storage device 104 may include a display module 118 to enable the display to be configured. The display module 118 may be any combination of firmware, software executable by the CPU 102, logic, and the like.

The memory device 106 can include random access memory (RAM), read only memory (ROM), flash memory, or any other suitable memory systems. For example, the memory device 106 may include dynamic random access memory (DRAM). The memory device 106 can include random access memory (RAM) (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.), flash memory, or any other suitable memory systems.

The CPU 102 may be a main processor that is adapted to execute the stored instructions. The CPU 102 may be a single core processor, a multi-core processor, a computing cluster, or any number of other configurations. The CPU 102 may be implemented as Complex Instruction Set Computer (CISC) or Reduced Instruction Set Computer (RISC) processors, x86 Instruction set compatible processors, multi-core, or any other microprocessor or central processing unit (CPU). The CPU 102 may be connected through a system bus 120 (e.g., Peripheral Component Interconnect (PCI), Industry Standard Architecture (ISA), PCI-Express, Hyper-Transport®, NuBus, etc.) to components including the memory 106 and the storage device 104. The CPU 102 may also be linked through the bus 120 to the wireless architecture 108.

In some cases, the computing device 100 may be a mobile computing device. In some cases, the external display devices 110 may be mobile external display devices to a mobile computing device.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
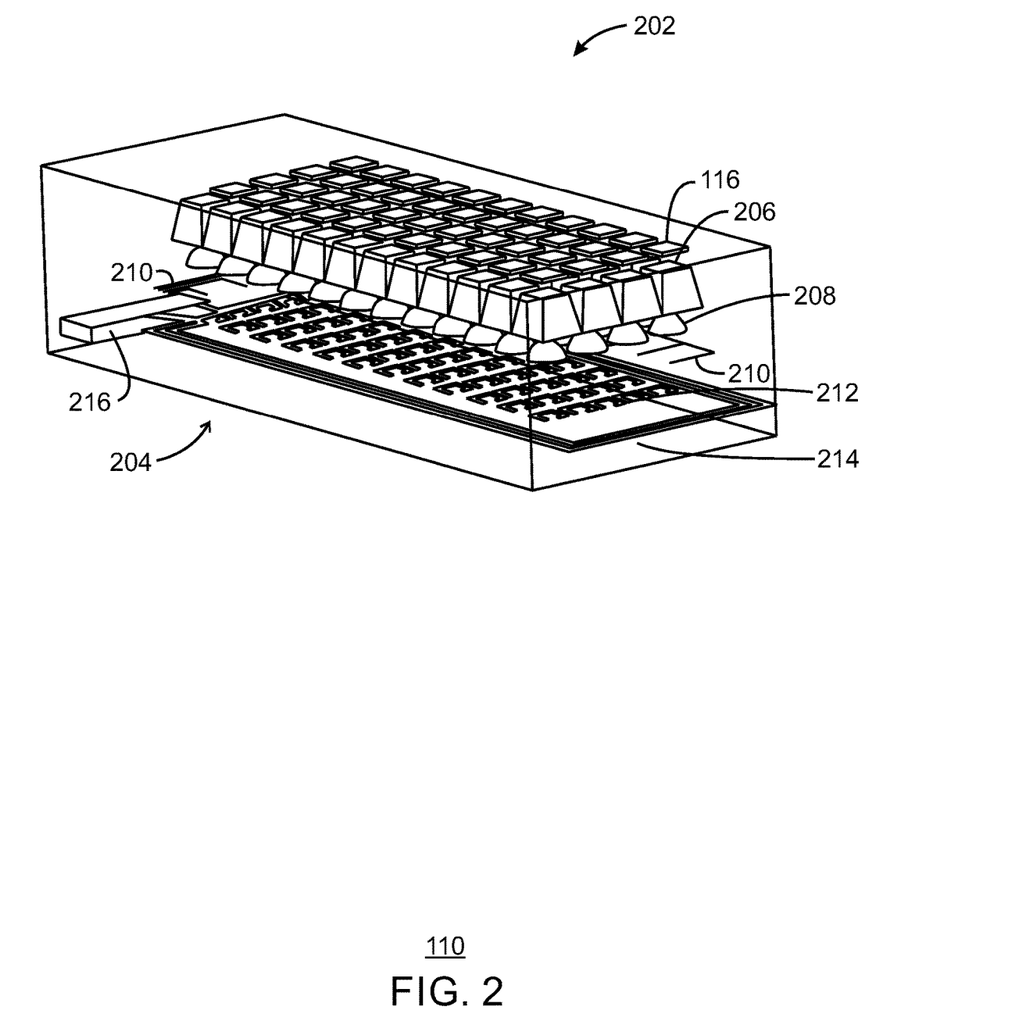
FIG. 2 is a perspective view of an input device having wireless components and displays.

FIG. 2 is a perspective view of an input device having wireless components and displays. In FIG. 2, the input device 110 of FIG. 1 is a keyboard generally indicated at 202, while the wireless architecture 108 is a NFC wireless transceiver generally indicated at 204.

The keyboard 202 may include displays, such as the display 116 of FIG. 1, a resilient dome 208, and keys 206 wherein a wireless receiver, such as the wireless receiver 112 of FIG. 1 may be disposed. In this example, the wireless receiver may be a NFC receiving coil. Although not illustrated in FIG. 2, the keys 206 may house the NFC receiving coil 112, to receive energy and data while traveling over the dome 208 to provide tactile feedback when one of the keys 206 is pressed.

The input device 110 may include a switching matrix 210, an array of parasitic coils 212, a NFC transceiver coil 214, and a NFC module 216. The array of parasitic coils 212 may be implemented to distribute an electromagnetic field generated by the NFC transceiver 214 during a broadcast of an NFC signal initiated by the NFC module 216. The distribution may be thought of as a redistribution of the electromagnetic field by inductive coupling between the NFC transceiver coil 214 and each of the parasitic coils in the parasitic coil array 212. Further, a NFC receiving coil associated with each of the keys may inductively couple to a corresponding parasitic coil in the parasitic coil array 212 during an NFC signal broadcast.

The NFC module 216 may be configured to operate in two modes. The first mode may be considered a high power mode. In this mode, the NFC module 216 powers the NFC transceiver coil such that an NFC signal is broadcast and received by NFC receiving coils associated with each of the keys 206. In high power mode, the NFC broadcast signal may provide enough power to change the display. In the high power mode, the NFC broadcast signal may also provide data indicating what should be displayed at each of the displays 116.

Figure 3:
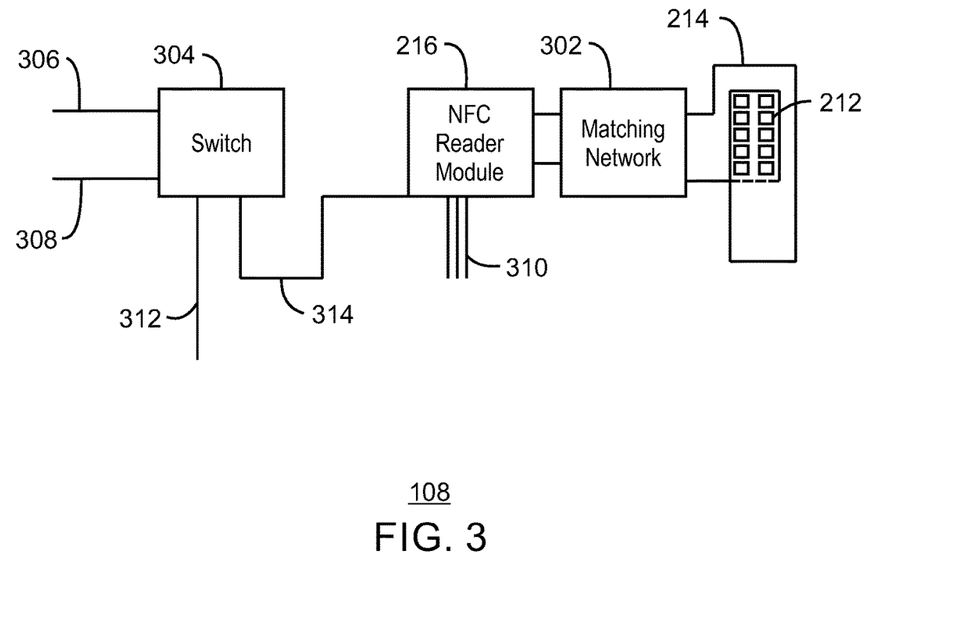
FIG. 3 is a block diagram illustrating a wireless architecture to communicate with an input device.

FIG. 3 is a block diagram illustrating a wireless architecture to communicate with an input device. The wireless architecture, such as the wireless architecture 108 of FIG. 1, may include the NFC transceiver coil 214, the parasitic coil array 212, and the NFC reader module 216 discussed above in regard to FIG. 2.

The wireless architecture 108 may also include a matching network 302, a switch 304, a high voltage supply line 306, and a low voltage supply line 308. Signals from a computing platform, such as an operating system of the computing device 100, may be received by each of the NFC reader module 216 and the switch 304, as indicated at 310 and 312. In some cases, the NFC reader module 216 may provide a control signal to the switch 304 depending on voltage requirements for different power modes, as discussed in more detail below, and as indicated at 314.

The matching network 302 may condition signals and power transmitted between the NFC module 216 and the NFC transceiver coil 214 in an alternating current, and provide them to the NFC module 216. During high power mode, a control from the NFC module 216 may direct the switch 304 to enable the high voltage supply line 306 to provide high voltage to the NFC module 216. Signals, including power and data, may be provided to an NFC receiver to erase and write to each of the displays during high power mode. In low power mode, the NFC module 216 may detect changes in inductive coupling between individual NFC receivers at each of the keys 206 indicating when a key is pressed. Therefore, in embodiments, a switching matrix, such as the switching matrix 210 of FIG. 2, may not be required.

Figure 4:
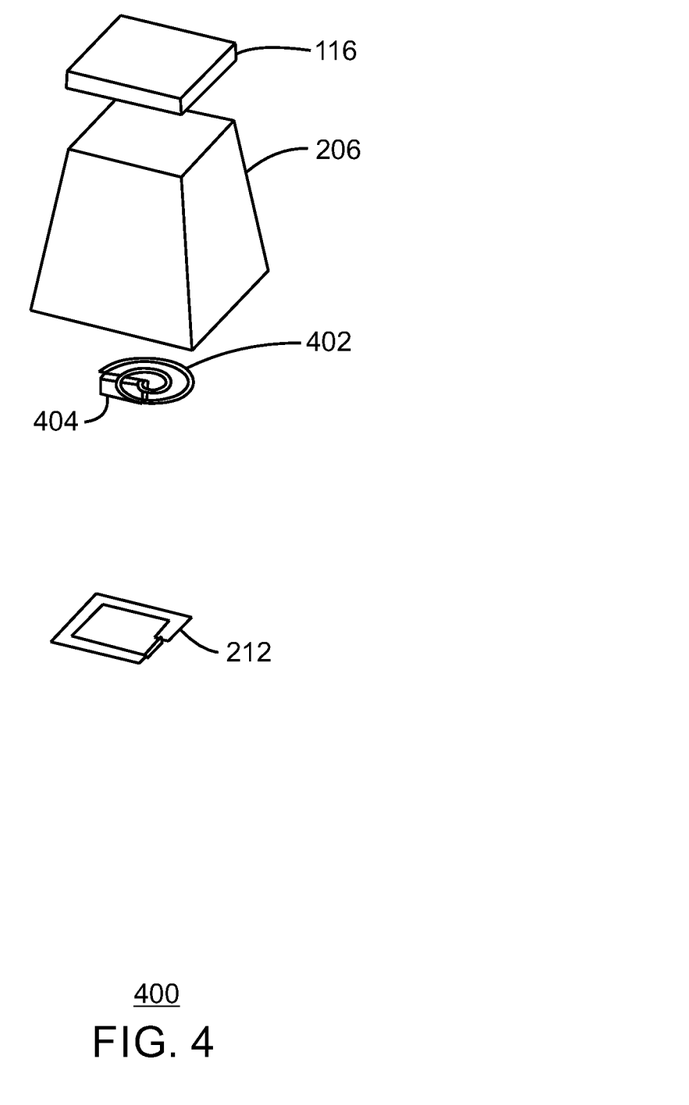
FIG. 4 is an exploded view of a key of an input device having wireless components and a display.

FIG. 4 is an exploded view of a key of an input device having wireless components and a display. As discussed above in regard to FIG. 1 and FIG. 2, a display, such as the display 116, may be disposed at an input device including a keyboard having a key 206. A key, such as the key 206 may be configured to house a NFC receiving coil 402 and a NFC tag chip. The NFC receiving coil 402 may be configured to communicatively couple with the NFC transceiver coil 214 via the parasitic could 212. As discussed above, the parasitic coil 212 may be inductively coupled to a NFC transceiver coil, such as the NFC transceiver coil 214 of FIG. 2. In some cases, there may be an individual transceiver coil for each receiver coil.

The inductive coupling of the NFC receiving coil 402 to the parasitic coil 212 may enable predictable design of the receiver by redistributing the fields to the NFC receiving coil 402. Power and data transferred may be as a result of an NFC broadcast signal provided from the NFC module 216 and the NFC reader coil 214 of FIG. 2. The NFC tag chip 404 may be configured to identify when a NFC broadcast signal is unique to the NFC tag chip 404, and therefore unique to the display 116. In some cases, the NFC broadcast signal is not unique to any given NFC tag chip, and may cause operations to be performed such as erasing a given display, writing to one more displays, and the like.

Figure 5:
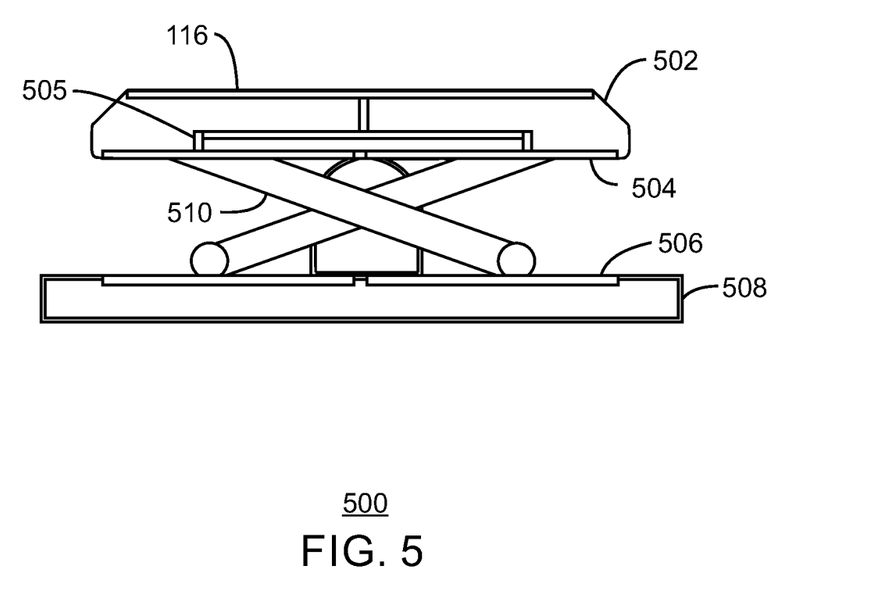
FIG. 5 is a side view of a key of an input device having a wireless architecture.

FIG. 5 is a side view of a key of an input device having a wireless architecture. In the example illustrated in FIG. 5, the input device includes a keyboard 500 having a keycap 502 of a key 500. In this example, the wireless receiver 112 of FIG. 1 includes a receiver metal pad 504 at a bottom side of the keycap 502. A receiver 505 may communicatively couple the receiver metal pad 504 to the display 116. The wireless architecture 108 of FIG. 1 may include a transmitter metal pad 506 at a base 508 of the keyboard 500.

A capacitive coupling between the receiver metal pad 504 and the transmitter metal pad 506 may exist. The capacitive coupling may provide power and data to the display. In some cases, the data may be provided by modulation of the broadcast signal indicating content to be displayed at the display 116. A tactile mechanism 510 may be used to provide tactile feedback when the keycap 502 is pressed.

Similar to the NFC embodiment discussed above in regard to FIGS. 2-4, the contactless or wireless implementation of FIG. 5 may allow travel of the key 502 without impeding physical wires and the like. In some cases, a combination of NFC components discussed above in regard to FIGS. 2-4, and the implementation of FIG. 5 may be used to obtain similar results.

Figure 6:
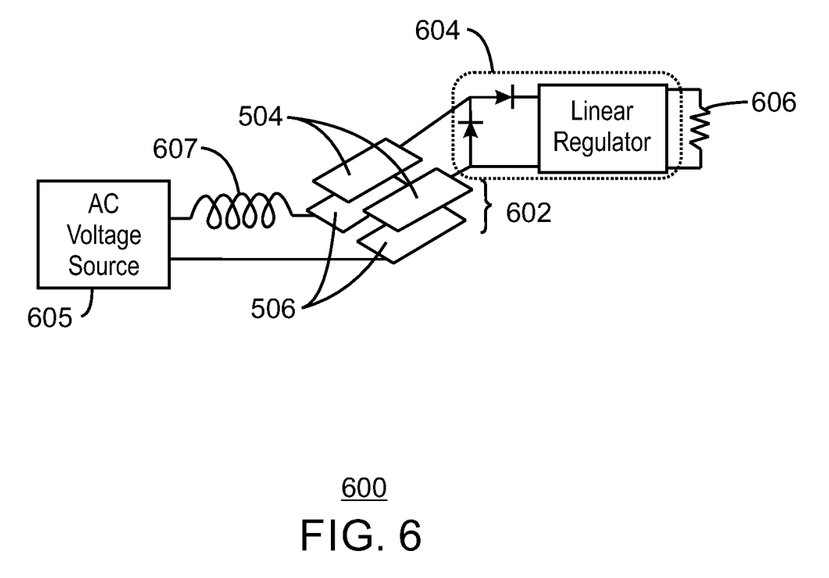
FIG. 6 is a diagram illustrating a circuit for increasing voltage received at a display.

FIG. 6 is a diagram illustrating a circuit for increasing voltage received at a display. In some cases, power, or its corresponding voltage, or current received at the key may need to be increased. For example, in some cases a display may be associated with a voltage swing that is higher than may be received by either the capacitive coupling of FIG. 5, or the NFC implementations of FIGS. 2-4.

FIG. 6 illustrates the capacitive coupling 602 between the metal pads 504 and 506 may be provided to a circuit, indicated at 604. Voltage may be provided from a voltage source, such as an alternating current voltage source 605, connected to an inductor 607. At a frequency of the voltage source 605, the inductor 607 may be configured to generate a resonance with the metal pads 504 and 506.

In some cases, the circuit 604 may include a voltage multiplier. In some cases, the circuit 604 may include a rectifier and a linear regulator. A rectifier may be configured to generate a direct current voltage from an alternating current voltage signal received. A demodulator (not shown) may extract data from the rectified DC voltage, and store this serial data. In some cases, a display voltage extractor (not shown) may be included to extract voltage from the rectified voltage to drive the display. In this scenario, a display driver (not shown) may be used to drive the display by switches activated based on the demodulated data.

In any case, the combination of the circuits 607, 506, 504, and 604 are configured to increase the voltage to the level of a load presented by the display as indicated at 606. The voltage may be increased by means of a voltage multiplier on the receiver and or transmitter, resonance with the inductor 607 at a transmitter, and or resonance at the receiver, or a combination thereof. Although FIG. 6 illustrates the circuit 604 being implemented using metal pads 504, the circuit 604 may be applied and implemented in the NFC embodiments generally discussed above in regard to FIGS. 2-4.

It may be important to note that by using an inductor 607 a resonance scheme including a mechanism for voltage amplification passively without additional active components may be achieved. Further, data transfer in such a scheme may be implemented with modulation schemes like amplitude, PWM, and the like. Such modulation schemes may be implemented with low cost and low power consumption. The scheme may be further useful in cases where higher voltages are required in the receiver exploiting the voltage amplification of the resonant circuit. Specific applications include devices that employ bistable display(s) as they may require voltage (±/−15V) to change the state of display.

Figure 7:
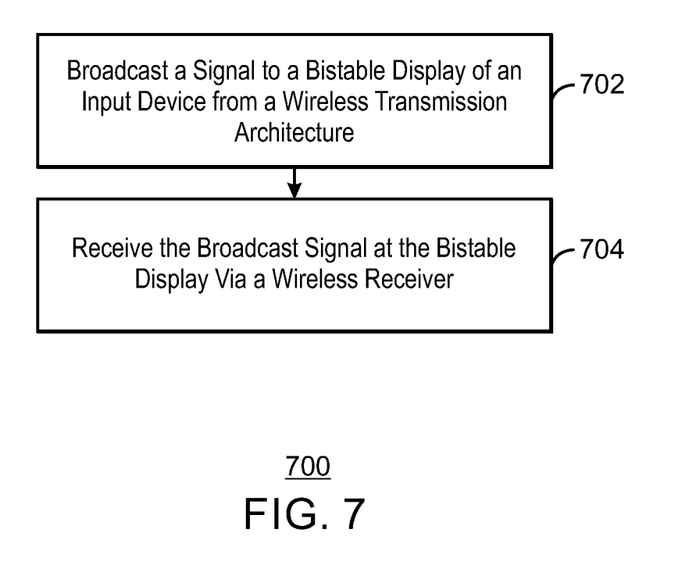
FIG. 7 is a block diagram illustrating a method for wireless communication with a display.

FIG. 7 is a block diagram illustrating a method for wireless communication with a display. At block 702, a signal is broadcast to a display of an input device from a wireless transmission architecture. As discussed above, the wireless transmission architecture may be an NFC implementation as generally discussed in regard to FIGS. 2-4, a capacitive coupling as generally discussed in regard to FIG. 5 and FIG. 6, or any combination thereof.

At block 704, the broadcast signal is received at the display via a wireless receiver. The wireless receiver may be an NFC implementation as generally discussed in regard to FIGS. 2-4, a capacitive coupling as generally discussed in regard to FIG. 5 and FIG. 6, or any combination thereof.

In the NFC case, the method 700 may include initiating an NFC signal at an NFC module, emitting the NFC signal from an NFC transceiver coil, and inductively coupling the NFC transceiver coil to a parasitic coil, wherein the inductive coupling increases uniformity of the electromagnetic field across an area associated with the input device. The method 700 may also include inductively coupling the parasitic coil to the wireless receiver comprising an NFC receiver coil at the input device.

In some cases, the method 700 may include entering a high power mode during the NFC signal broadcast providing the power signal, the data signal, or any combination thereof to the NFC receiver coil. The method 700 may also include entering a low power mode wherein an input from the input device are detected by changes in inductance between the NFC receiver coil and the parasitic coil.

In some cases, the input device is a keyboard, wherein the display is disposed on a top of a keycap of the keyboard. In this scenario, the method 700 may include detecting the input from the input device comprising a key press of the keycap in low power mode. Further, the method 700 may include detecting when the broadcast signal is unique to a NFC tag at the NFC receiver coil. The method 700 may also include conditioning of the broadcast signal received at the NFC coil. For example boosting voltage, converting from AC to DC, boosting current, matching source impedance via a rectifier and a linear regulator, increasing voltage of the broadcast signal received at the NFC receiver coil via a voltage multiplier, or any combination thereof.

In some cases, the parasitic coil is one parasitic coil in an array of parasitic coils disposed across the area associated with the input device. In this scenario, the method 700 may further include inductively coupling the parasitic array to the NFC transceiver coil during the NFC broadcast signal.

As discussed above, in some cases, the input device is a keyboard, wherein the display is disposed on a top of a keycap of the keyboard. In this scenario, the broadcasting the signal includes capacitively coupling a metal pad on a bottom side of the keycap to a metal pad disposed on a base the keyboard. In some cases, the method may also include increasing voltage of the broadcast signal received at the keycap via an inductor 607 on the transmitter, via resonance or voltage multiplier circuit on the transmitter or receiver, or via a combination thereof. The rectifier creates direct current, or additionally is the first stage of a multiplier. The linear regulator creates a proper, stable voltage on the keycap. Data may be transmitted with the power by using amplitude or pulse width modulation or any other in-band modulation and demodulation scheme.

Figure 8:
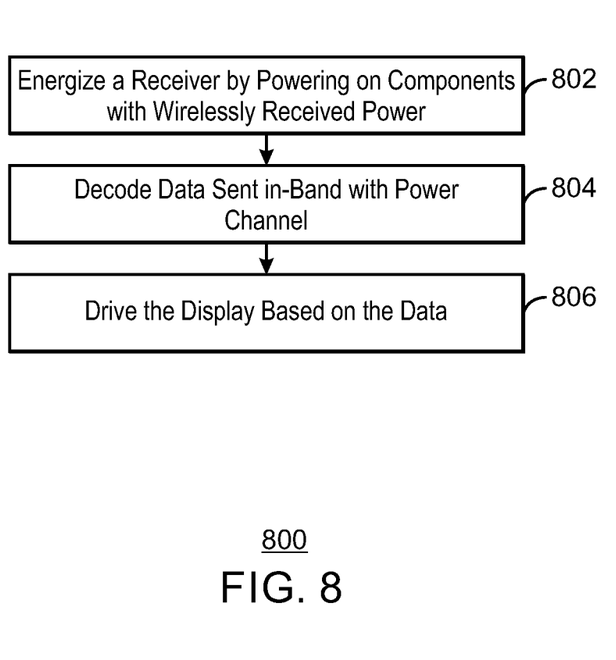
FIG. 8 is a block diagram illustrating a method of energizing components and driving a display at an input device.

FIG. 8 is a block diagram illustrating a method of energizing components and driving a display at an input device. As discussed above in regard to FIG. 7 at block 704, the signal is received at a display via a wireless receiver. At block 802 of FIG. 8, the receiver may be energized by powering on components with the wirelessly received power of the signal. At block 804, data is decoded. The data may be sent in-band with a power channel of the received signal. At 806, the display is driven based on the data decoded at block 804.

Examples may include subject matter such as a method, means for performing acts of the method, at least one machine-readable medium including instructions that, when performed by a machine cause the machine to performs acts of the method. It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

Example 1 includes an apparatus for wireless communication. The apparatus includes a display at an input device. In some cases, the display is a bistable ePaper display. The apparatus includes a wireless transmission architecture to broadcast a signal to the display, and a wireless receiver to receive the broadcast signal at the display. The broadcast signal is configured to provide a power signal to initiate operations of the display, a data signal to provide content to be displayed at the display, or any combination thereof.

In some cases in Example 1, the wherein the wireless receiver may include an near-field communication (NFC) receiver coil, and wherein the wireless transmission architecture includes a NFC transceiver coil, wherein the broadcast signal is a NFC signal having an electromagnetic field. The wireless transmission architecture also includes a NFC module to direct the NFC transceiver coil to broadcast the NFC signal, and a parasitic coil to inductively couple to the NFC transceiver coil. The inductive coupling increases uniformity of the electromagnetic field across an area associated with the input device, and wherein the parasitic coil is to inductively couple to the NFC receiver coil. In this scenario, the NFC module is to operate in two modes including a high power mode and a low power mode. In a high power mode, the power signal, the data signal, or any combination thereof are provided to the NFC receiver coil. In a low power mode, wherein from the input device are detected by changes in inductance between the NFC receiver coil and the parasitic coil. In some cases, the input device includes a keyboard, wherein the display is disposed on a top of a keycap of the keyboard, wherein inputs from the input device comprise a key press of the keycap to be detected in low power mode. The apparatus may also include a NFC tag at the NFC receiver coil, wherein the NFC tag may be configured to detect when the broadcast signal is unique to the NFC tag. In some cases, parasitic coil is one parasitic coil in an array of parasitic coils disposed across at least a portion of the area associated with the input device.

In some cases in Example 1, the input device comprises a keyboard, wherein the display is disposed on a top of a keycap of the keyboard. The input device may further include a rectifier and a linear regulator, wherein the rectifier and the linear regulator communicatively couple the display to the NFC receiver coil, and are configured to condition the power signal.

In some cases in Example 1, the input device comprises a keyboard, wherein the display is disposed on a top of a keycap of the keyboard. The input device may further include a voltage multiplier to increase voltage of the broadcast signal received at the NFC receiver coil, a rectifier, a linear regulator, or any combination thereof.

In some cases in Example 1, the input device comprises a keyboard, wherein the display is disposed on a top of a keycap of the keyboard. The input device may further include a metal pad disposed on a bottom side of the keycap, and a metal pad disposed on a base the keyboard configured to be capacitively coupled to the metal pad on the bottom side of the keycap by the broadcast signal. In this scenario, the input device further includes an inductor, a rectifier, and a linear regulator, wherein the rectifier and the linear regulator communicatively coupled the display to the metal pad disposed on the bottom side of the keycap.

In yet other cases of Example 1, any combination of the cases of the apparatus may be implemented. For example, metal key caps, NFC architectures, linear regulators, voltage multipliers, inductors, may be combined in any combination.

Example 2 includes a method for wireless communication. The method includes broadcasting a signal to a display of an input device from a wireless transmission architecture, and receiving the broadcast signal at the display via a wireless receiver. The broadcast signal is to provide a power signal to initiate operations of the display, a data signal to provide content to be displayed at the display, of any combination thereof.

In some cases of Example 2, the wireless transmission architecture is a near-field communication (NFC) architecture. In this scenario, broadcasting the wireless signal includes initiating an NFC signal at an NFC module, emitting the NFC signal from an NFC transceiver coil, and inductively coupling the NFC transceiver coil to a parasitic coil, wherein the inductive coupling increases uniformity of the electromagnetic field across an area associated with the input device. Broadcasting the wireless signal may further include inductively coupling the parasitic coil to the wireless receiver comprising an NFC receiver coil at the input device.

In these cases of Example 2, the method may further include entering a high power mode during the NFC signal broadcast providing the power signal, the data signal, or any combination thereof to the NFC receiver coil. The method may also include entering a low power mode wherein an input from the input device is detected by changes in inductance between the NFC receiver coil and the parasitic coil. In some cases, the input device comprises a keyboard, wherein the display is disposed on a top of a keycap of the keyboard, further comprising detecting the input from the input device comprising a key press of the keycap in low power mode. Further, the method may include detecting when the broadcast signal is unique to a NFC tag at the NFC receiver coil.

In these cases of Example 2, the parasitic coil is one parasitic coil in an array of parasitic coils disposed across at least a portion of the area associated with the input device. The method further includes inductively coupling the parasitic array to the NFC transceiver coil during the NFC broadcast signal.

In some cases of Example 2, the input device comprises a keyboard. The display may be disposed on a top of a keycap of the keyboard. The method may further include increasing voltage of the broadcast signal received at the NFC coil via a rectifier and a linear regulator. In some cases, the method may include increasing voltage of the broadcast signal received at the NFC receiver coil via a voltage multiplier.

In some cases of Example 2, the display is disposed on a top of a keycap of the keyboard. Broadcasting the signal comprises capacitively coupling a metal pad on a bottom side of the keycap to a metal pad disposed on a base the keyboard. In these cases, the method may include increasing voltage of the broadcast signal received at the keycap via a rectifier and a linear regulator disposed on the keycap.

In yet other cases of Example 2, any combination of the method may be implemented. For example, metal key caps, NFC architectures, linear regulators, voltage multipliers, inductors, may be combined in any combination.

Example 3 includes a system for wireless communication. The system includes a keycap of a keyboard, and a disposed on a top side of the keycap. In some cases, the display is a bistable ePaper display. The system includes a wireless transmission architecture to broadcast a signal to the display, and a wireless receiver to receive the broadcast signal at the display. The broadcast signal is configured to provide a power signal to initiate operations of the display, a data signal to provide content to be displayed at the display, or any combination thereof.

In some cases in Example 3, the wherein the wireless receiver may include an near-field communication (NFC) receiver coil, and wherein the wireless transmission architecture includes a NFC transceiver coil, wherein the broadcast signal is a NFC signal having an electromagnetic field. The wireless transmission architecture also includes a NFC module to direct the NFC transceiver coil to broadcast the NFC signal, and a parasitic coil to inductively couple to the NFC transceiver coil. The inductive coupling increases uniformity of the electromagnetic field across an area associated with the input device, and wherein the parasitic coil is to inductively couple to the NFC receiver coil. In this scenario, the NFC module is to operate in two modes including a high power mode and a low power mode. In a high power mode, the power signal, the data signal, or any combination thereof are provided to the NFC receiver coil. In a low power mode, wherein from the input device are detected by changes in inductance between the NFC receiver coil and the parasitic coil. In some cases, inputs from the keyboard include a key press of the keycap to be detected in low power mode. The system may also include a NFC tag at the NFC receiver coil, wherein the NFC tag may be configured to detect when the broadcast signal is unique to the NFC tag. In some cases, parasitic coil is one parasitic coil in an array of parasitic coils disposed across at least a portion of the area associated with the input device.

In some cases in Example 3, the keyboard may further include a rectifier and a linear regulator, wherein the rectifier and the linear regulator are communicatively coupled the display to the NFC receiver coil, and are to condition power signal. In some cases in Example 3, keyboard may further include a voltage multiplier to increase voltage of the broadcast signal received at the NFC receiver coil, a rectifier, a linear regulator, or any combination thereof.

In some cases in Example 3, the keyboard may further include a metal pad disposed on a bottom side of the keycap, and a metal pad disposed on a base the keyboard configured to be capacitively coupled to the metal pad on the bottom side of the keycap by the broadcast signal. In this scenario, the keyboard further includes an inductor, a rectifier, and a linear regulator, wherein the rectifier and the linear regulator communicatively coupled the display to the metal pad disposed on the bottom side of the keycap.

In yet other cases of Example 3, any combination of the cases of the system may be implemented. For example, metal key caps, NFC architectures, linear regulators, voltage multipliers, inductors, may be combined in any combination.

Example 4 includes a system for wireless communication. The system includes a keycap of a keyboard, and a disposed on a top side of the keycap. In some cases, the display is a bistable ePaper display. The system includes a means for wireless transmission to broadcast a signal to the display, and a wireless receiver to receive the broadcast signal at the display. The broadcast signal is configured to provide a power signal to initiate operations of the display, a data signal to provide content to be displayed at the display, or any combination thereof.

In some cases in Example 4, the wherein the wireless receiver may include an near-field communication (NFC) receiver coil, and wherein the means for wireless transmission includes a NFC transceiver coil, wherein the broadcast signal is a NFC signal having an electromagnetic field. The means for wireless transmission also includes a NFC module to direct the NFC transceiver coil to broadcast the NFC signal, and a parasitic coil to inductively couple to the NFC transceiver coil. The inductive coupling increases uniformity of the electromagnetic field across an area associated with the input device, and wherein the parasitic coil is to inductively couple to the NFC receiver coil. In this scenario, the NFC module is to operate in two modes including a high power mode and a low power mode. In a high power mode, the power signal, the data signal, or any combination thereof are provided to the NFC receiver coil. In a low power mode, wherein from the input device are detected by changes in inductance between the NFC receiver coil and the parasitic coil. In some cases, inputs from the keyboard include a key press of the keycap to be detected in low power mode. The system may also include a NFC tag at the NFC receiver coil, wherein the NFC tag may be configured to detect when the broadcast signal is unique to the NFC tag. In some cases, parasitic coil is one parasitic coil in an array of parasitic coils disposed across at least a portion of the area associated with the input device.

In some cases in Example 4, the keyboard may further include a rectifier and a linear regulator, wherein the rectifier and the linear regulator are communicatively coupled the display to the NFC receiver coil, and are to condition power signal. In some cases in Example 4, keyboard may further include a voltage multiplier to increase voltage of the broadcast signal received at the NFC receiver coil, a rectifier, a linear regulator, or any combination thereof.

In some cases in Example 4, the means for wireless transmission may further include a metal pad disposed on a bottom side of the keycap, and the wireless receiver includes metal pad disposed on a base the keyboard configured to be capacitively coupled to the metal pad on the bottom side of the keycap by the broadcast signal. In this scenario, the keyboard further includes an inductor, a rectifier, and a linear regulator, wherein the rectifier and the linear regulator communicatively coupled the display to the metal pad disposed on the bottom side of the keycap.

In yet other cases of Example 4, any combination of the cases of the system may be implemented. For example, metal key caps, NFC architectures, linear regulators, voltage multipliers, inductors, may be combined in any combination.

Example 5 includes a method for wireless communication. The method includes broadcasting a signal to a display of an input device from a means for wireless transmission, and receiving the broadcast signal at the display via a wireless receiver. The broadcast signal is to provide a power signal to initiate operations of the display, a data signal to provide content to be displayed at the display, of any combination thereof.

In some cases of Example 5, the means for wireless transmission is a near-field communication (NFC) architecture. In this scenario, broadcasting the wireless signal includes initiating an NFC signal at an NFC module, emitting the NFC signal from an NFC transceiver coil, and inductively coupling the NFC transceiver coil to a parasitic coil, wherein the inductive coupling increases uniformity of the electromagnetic field across an area associated with the input device. Broadcasting the wireless signal may further include inductively coupling the parasitic coil to the wireless receiver comprising an NFC receiver coil at the input device.

In these cases of Example 5, the method may further include entering a high power mode during the NFC signal broadcast providing the power signal, the data signal, or any combination thereof to the NFC receiver coil. The method may also include entering a low power mode wherein an input from the input device is detected by changes in inductance between the NFC receiver coil and the parasitic coil. In some cases, the input device comprises a keyboard, wherein the display is disposed on a top of a keycap of the keyboard, further comprising detecting the input from the input device comprising a key press of the keycap in low power mode. Further, the method may include detecting when the broadcast signal is unique to a NFC tag at the NFC receiver coil.

In these cases of Example 5, the parasitic coil is one parasitic coil in an array of parasitic coils disposed across at least a portion of the area associated with the input device. The method further includes inductively coupling the parasitic array to the NFC transceiver coil during the NFC broadcast signal.

In some cases of Example 5, the input device comprises a keyboard. The display may be disposed on a top of a keycap of the keyboard. The method may further include increasing voltage of the broadcast signal received at the NFC coil via a rectifier and a linear regulator. In some cases, the method may include increasing voltage of the broadcast signal received at the NFC receiver coil via a voltage multiplier.

In some cases of Example 5, the display is disposed on a top of a keycap of the keyboard. Broadcasting the signal comprises capacitively coupling a metal pad of the means for wireless transmission on a bottom side of the keycap to a metal pad of the wireless receiver disposed on a base the keyboard. In these cases, the method may include increasing voltage of the broadcast signal received at the keycap via a rectifier and a linear regulator disposed on the keycap.

In yet other cases of Example 5, any combination of the method may be implemented. For example, metal key caps, NFC architectures, linear regulators, voltage multipliers, inductors, may be combined in any combination.

In the above description and the following claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices.

An embodiment is an implementation or example. Reference in the present specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for wireless communication, comprising:
   a pressable component of a device to provide tactile feedback, the device comprising:
   a display to display content comprising a wireless receiver, wherein the wireless receiver comprises a near-field communication (NFC) receiver coil, and wherein a wireless transmitter comprises:
      an NFC transceiver coil, wherein the broadcast signal is an NFC signal having an electromagnetic field;
      an NFC module to direct the NFC transceiver coil to broadcast the NFC signal;
      a parasitic coil to inductively couple to the NFC transceiver coil, wherein the inductive coupling increases uniformity of the electromagnetic field across an area associated with the device, and wherein the parasitic coil is configured to inductively couple to the NFC receiver coil;
   the wireless receiver configured to receive at the display a broadcast signal from the wireless transmitter, wherein the broadcast signal is configured to provide a data signal configured to provide content, and:
      in response to a voltage of a high power signal to perform high power operations of the display; and
      in response to a voltage of a low power signal to perform low power operations of the display, wherein the voltage of the low power signal provides less voltage than the voltage of the high power signal,
      wherein the wireless receiver is configured to provide the data signal, and the voltage of the high power signal to initiate high power operations of the display or the voltage of the low power signal to initiate low power operations of the display.

2. The apparatus of claim 1, wherein the NFC module is configured to operate in two modes comprising:
   a high power mode wherein the high power signal, the data signal, or any combination thereof are provided to the NFC receiver coil; and
   a low power mode wherein inputs from the device are detected by changes in inductance between the NFC receiver coil and the parasitic coil.

3. The apparatus of claim 2, wherein the device comprises a keyboard, wherein the display is disposed on a top of a keycap of the keyboard, wherein the inputs from the device comprise a key press of the keycap to be detected in the low power mode.

4. The apparatus of claim 1, further comprising a NFC tag at the NFC receiver coil, wherein the NFC tag is configured to detect when the broadcast signal is unique to the NFC tag.

5. The apparatus of claim 1, wherein the parasitic coil is one parasitic coil in an array of parasitic coils disposed across at least a portion of the area associated with the device.

6. The apparatus of claim 1, wherein the device comprises a keyboard, wherein the display is disposed on a top of a keycap of the keyboard, the device further comprising:
   a rectifier; and
   a linear regulator, wherein the rectifier and the linear regulator communicatively couple the display to the NFC receiver coil, and perform conditioning of the broadcast signal.

7. The apparatus of claim 1, wherein the device comprises a keyboard, wherein the display is disposed on a top of a keycap of the keyboard, the device further comprising:
   a voltage multiplier to increase voltage of the broadcast signal received at the NFC receiver coil;
   a rectifier;
   a linear regulator, wherein the rectifier and the linear regulator communicatively couple the display to the NFC receiver coil, and perform conditioning of the broadcast signal.

8. The apparatus of claim 1, wherein the device comprises a keyboard, wherein the display is disposed on a top of a keycap of the keyboard, and wherein the wireless transmitter comprises:
   a first metal pad disposed on a bottom side of the keycap;
   a second metal pad disposed on a base of the keyboard, the second metal pad configured to be capacitively coupled to the first metal pad by the broadcast signal.

9. The apparatus of claim 8, the device further comprising:
   an inductor;
   a rectifier; and
   a linear regulator, wherein the rectifier and the linear regulator communicatively couple the display to the metal pad disposed on the bottom side of the keycap.

10. The apparatus of claim 1, wherein the data signal is provided to the NFC receiver coil by using a modulation scheme for the data signal.

11. A method for wireless communication, comprising:
    broadcasting a signal to a display of a device from a wireless transmitter, wherein the wireless transmitter is a near-field communication (NFC) architecture,
       wherein broadcasting the signal comprises:
       initiating an NFC signal at an NFC module;
       emitting the NFC signal from an NFC transceiver coil;
       inductively coupling the NFC transceiver coil to a parasitic coil, wherein the inductive coupling increases uniformity of an electromagnetic field across an area associated with the device;
       inductively coupling the parasitic coil to the wireless receiver comprising an NFC receiver coil at the device; and
    receiving the broadcast signal at the display via a wireless receiver, wherein the broadcast signal is configured to provide a data signal configured to provide content to be displayed at the display, and:
       in response to a voltage of a high power signal to initiate high power operations of the display; and
       in response to a voltage of a low power signal to initiate low power operations of the display, wherein the voltage of the low power signal provides less voltage than the voltage of the high power signal; and
    providing, by the wireless receiver in response to the voltage of a high power signal, the voltage of the high power signal to initiate high power operations of the display;
    providing, by the wireless receiver in response to the voltage of a low power signal, the voltage of the low power signal to initiate low power operations of the display; and
    providing, by the wireless receiver, the data signal for the display to display the content.

12. The method of claim 11, further comprising:
entering a high power mode during the NFC signal broadcast providing the voltage of the high power signal, the data signal, or any combination thereof to the NFC receiver coil; and
entering a low power mode wherein an input from the device is detected by changes in inductance between the NFC receiver coil and the parasitic coil.

13. The method of claim 12, wherein the device comprises a keyboard, wherein the display is disposed on a top of a keycap of the keyboard, further comprising detecting the input from the device comprising a key press of the keycap in the low power mode.

14. The method of claim 11, further comprising detecting when the broadcast signal is unique to an NFC tag at the NFC receiver coil.

15. The method of claim 11, wherein the parasitic coil is one parasitic coil in an array of parasitic coils disposed across at least a portion of the area associated with the device, further comprising inductively coupling the parasitic array to the NFC transceiver coil during the NFC broadcast signal.

16. The method of claim 11, wherein the device comprises a keyboard, wherein the display is disposed on a top of a keycap of the keyboard, further comprising increasing voltage of the broadcast signal received at the NFC coil via a rectifier and a linear regulator.

17. The method of claim 11, wherein the device comprises a keyboard, wherein the display is disposed on a top of a keycap of the keyboard, further comprising increasing voltage of the broadcast signal received at the NFC receiver coil via a voltage multiplier.

18. The method of claim 11, wherein the device comprises a keyboard, wherein the display is disposed on a top of a keycap of the keyboard, wherein broadcasting the signal comprises capacitively coupling a metal pad on a bottom side of the keycap to a metal pad disposed on a base the keyboard.

19. The method of claim 18, further comprising increasing voltage of the broadcast signal received at the keycap via a rectifier and a linear regulator disposed on the keycap.

20. A system for wireless communication, comprising:
a keycap of a keyboard;
a display disposed on a top side of the keycap;
a wireless transmitter to broadcast a signal to the display, wherein a wireless receiver comprises a near-field communication (NFC) receiver coil, and wherein wireless transmission architecture comprises:
an NFC transceiver coil, wherein the broadcast signal is an NFC signal having an electromagnetic field;
an NFC module to direct the NFC transceiver coil to broadcast the NFC signal;
a parasitic coil to inductively couple to the NFC transceiver coil, wherein the inductive coupling increases uniformity of the electromagnetic field across an area associated with the input device, and wherein the parasitic coil is configured to inductively couple to the NFC receiver coil;
the wireless receiver to receive the broadcast signal at the display, wherein the broadcast signal is configured to provide a data signal to provide content to be displayed at the display, and:
a voltage of a high power signal to initiate high power operations of the display;
a voltage of a low power signal to initiate low power operations of the display,
wherein the wireless receiver is configured to:
provide the voltage of the high power signal to initiate high power operations of the display in response to the broadcast signal being configured to provide the voltage of the high power signal;
provide the voltage of the low power signal to initiate low power operations of the display in response to the broadcast signal being configured to provide the voltage of the low power signal; and
provide the data signal.

21. The system of claim 20, wherein the NFC module is configured to operate in two modes comprising:
a high power mode wherein the voltage of the high power signal, the data signal, or any combination thereof are provided to the NFC receiver coil; and
a low power mode wherein a keypress of the keycap is detected by changes in inductance between the NFC receiver coil and the parasitic coil.

22. The system of claim 20, wherein the wireless transmitter comprises:
a first metal pad disposed on a bottom side of the keycap; and
the wireless receiver comprises a second metal pad disposed on a base of the keyboard, the second metal pad being configured to be capacitively coupled to the first metal pad by the broadcast signal, the device further comprising:
a rectifier; and
a linear regulator, wherein the rectifier and the linear regulator communicatively couple the display to the first metal pad.

* * * * *